Dec. 14, 1926.
J. E. GLOEKLER
1,610,944
STEAM COOKER
Filed May 17, 1926  2 Sheets-Sheet 1
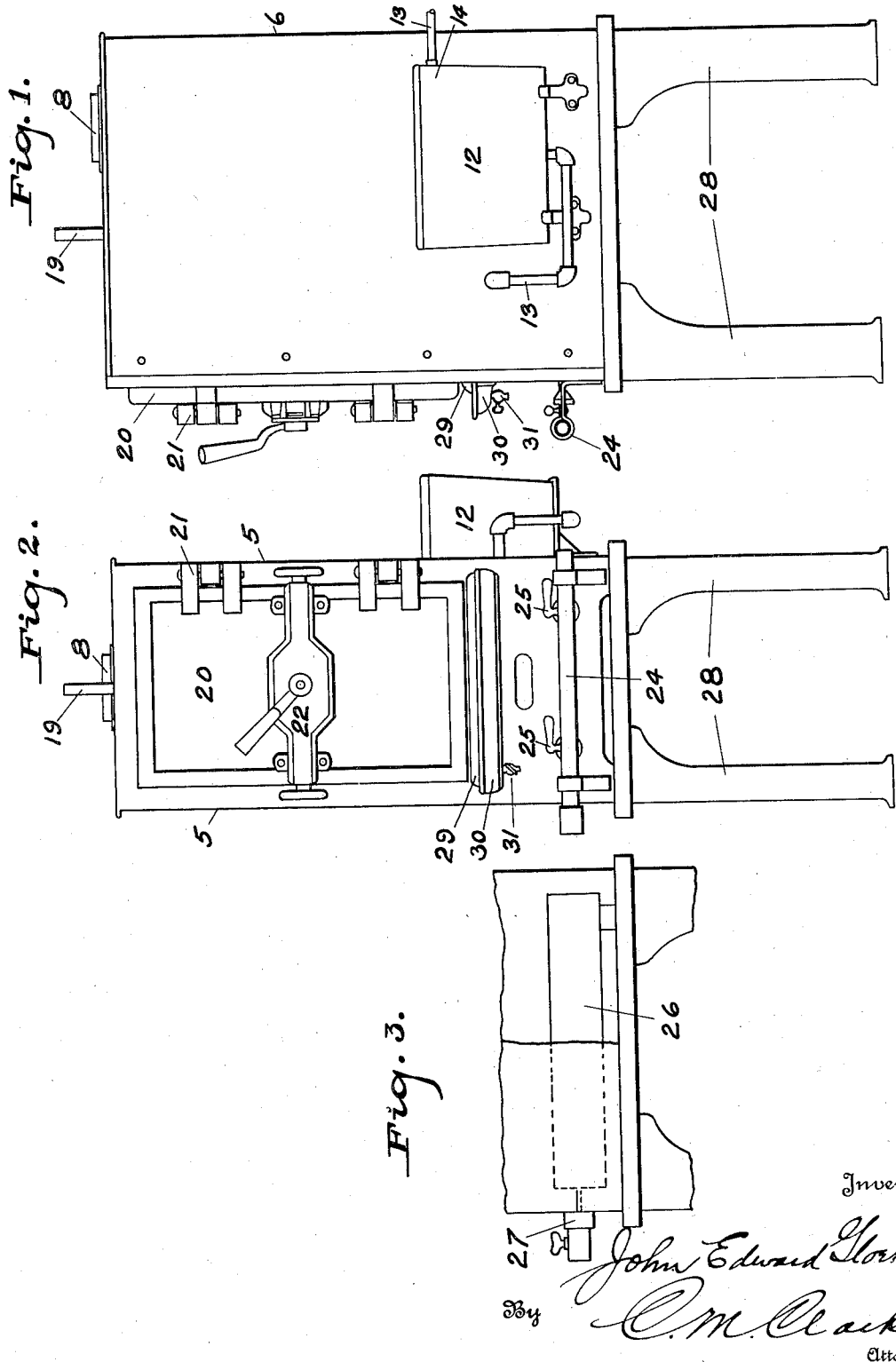
Inventor
John Edward Gloekler
By C. M. Clarke
Attorney

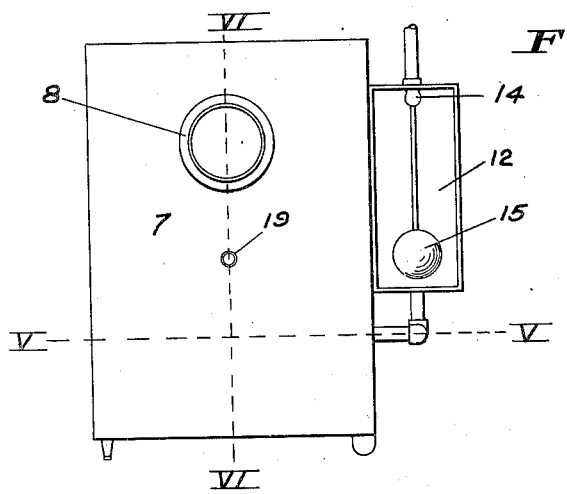
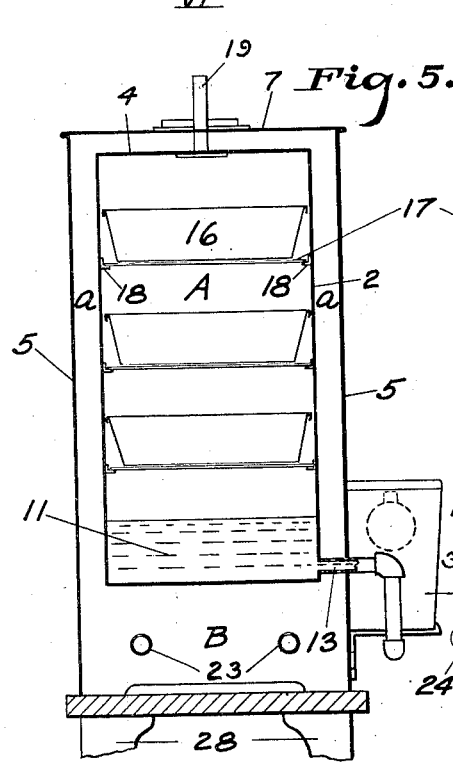
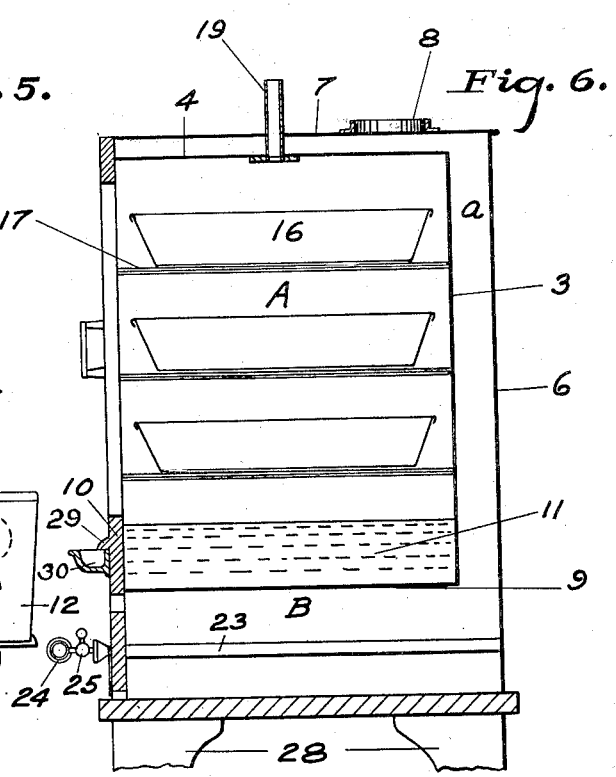

Patented Dec. 14, 1926.

1,610,944

UNITED STATES PATENT OFFICE.

JOHN EDWARD GLOEKLER, OF PITTSBURGH, PENNSYLVANIA.

STEAM COOKER.

Application filed May 17, 1926. Serial No. 109,621.

My invention refers to an improvement in steam cookers. It has for its object to provide an article or machine of such kind adapted to cook articles of food by application of steam heat directly in the form of an internally generated surrounding vapor.

Generally stated, it consists of a double wall casing provided with a water containing bath at the base, associated means for directly heating the water, means for regulating the water supply, and for carrying off the vapor, and other features of construction and operation as hereinafter more fully described.

Heretofore, cookers utilizing steam have operated in connection with an outside supply of generated steam, and the general operation of cooking or carrying on other similar operations by application of steam heat is not, therefore, broadly new.

In my invention, I provide a unitary construction capable of being located at any desired position, and of generating its own steam as used, by the combustion of a suitable fuel or electrically or otherwise generated heat.

In the drawings illustrating one preferred embodiment of the invention;

Fig. 1 is a view of the cooker in side elevation.

Fig. 2 is a similar view in front elevation.

Fig. 3 is a detail view partly broken away showing the utilization of electrically generated heat.

Fig. 4 is a plan view of the cooker.

Fig. 5 is a vertical sectional view on the line V, V, of Fig. 4.

Fig. 6 is a similar view at right angles thereto on the line VI, VI, of Fig. 4.

In the drawings, the cooking chamber or compartment is enclosed within an inner casing composed of side walls 2, a back wall 3 and a top 4. Such casing which is open at the bottom is enclosed within an outer casing composed of side walls 5, a back wall 6 and a top 7 provided with an outlet vent pipe or flue connection 8.

A bottom wall 9 tightly connected with rear wall 6 and a front wall 10, provides a water containing basin or reservoir 11 for steam-producing water. Such basin is in communication with a supply tank 12 by means of pipe 13 leading from the bottom of the tank up to and transversely through the side walls 2 and 5 to a point of supply, by which water in the basin 11 is maintained at a constant level with that in tank 12.

Tank 12 has a supply pipe 13 and an inlet valve 14 automatically controlled by the rising and falling float 15, of well known construction. Thus, as the water in basin 11 is utilized in making steam, its supply is automatically renewed from the tank.

The inner casing encloses the cooking compartment A in which food is placed in any suitable vessels, as trays 16, resting on supporting shelves 17 carried by brackets 18 at any desired levels, the shelves 17 being preferably of articulated construction, as wire, for transverse circulation of the steam.

An outlet pipe 19, which may be provided with a suitable regulating valve or damper, carries off any excess steam.

The inner casing is spaced inwardly of the outer wall providing surrounding circulation and insulating spaces a between the walls. A suitable door 20 is mounted by hinges 21 and provided with a convenient closing lock or fastening device 22, by which the door may be tightly clamped against the front opening, preferably with intervening packing strips of rubber or other suitable material.

Below the basin 11 is a heat producing chamber B within which are located suitable burner pipes 23, for combustion of fuel from a main supply pipe 24, and provided with individual regulating valves 25, suitable mixers, etc.

Combustion of fuel in chamber B generates the desired heat for producing steam from water in basin 11, dependent on the amount of fuel utilized, the products of combustion passing upwardly around the cooking compartment through spaces a and outwardly through flue 8.

If desired, one or more electrical resistance units 26 may be substituted for the fuel burners, with a switch controlled supply connection or socket 27, for current connection.

With either construction, the water in basin 11 may be heated to the desired temperature, and with the door closed, will effect the cooking of food of any kind within chamber A, in the same manner generally practiced with steam cookers.

The advantage of the construction is in its compact unitary nature providing a complete self-generating steam cooker.

The trays 16 may be inserted and withdrawn individually; the height of the supports may be varied according to requirements, and the heat is generated and maintained with great economy and regularity, due to the control and regulation of the fuel and water supply.

The main body portions may be made of sheet or plate metal, of durable economical construction, and mounted upon any suitable supporting base as the legs 28 for elevation above the floor.

The door 20 makes a tight fitting connection with the frame, and any water of condensation drips across sill 29 into a trough 30 having a drain cock 31 for release of any accumulated moisture. By means of the door as thus constructed, the apparatus is capable of tight closure, avoiding any escape of odor, and is otherwise extremely convenient and practicable in construction and operation.

It may, of course, be made in various sizes to adapt it to different requirements of use, and is readily available for continued or limited operation as desired.

Having described my invention, what I claim is:—

1. A steam cooker consisting of an outer casing having an uppermost outlet flue and a lower heat generating compartment, a heater in said compartment, an inner casing spaced inwardly from the sides, back and top of the outer casing providing a surrounding gas circulation conduit and terminating at the front in the plane of the outer casing, said inner casing having at its base a water containing bath, a front door framing and inner transverse supports above the bath, an outer water supply tank fixedly mounted on the side of the outer casing and connected with the bath, means for supplying water to the tank provided with water supply regulating mechanism, a front opening and closing door in the door framing, and means for collecting drip water from the door.

2. A steam cooker consisting of an outer casing having an uppermost outlet flue and a lower heat generating compartment, a heater in said compartment, an inner casing spaced inwardly from the sides, back and top of the outer casing providing a surrounding gas circulation conduit and terminating at the front in the plane of the outer casing, said inner casing having at its base a water containing bath, a front door framing and inner transverse supports above the bath, an opening and closing door in the framing, means for collecting drip water from the door, a water supply tank fixedly mounted at one side of the outer casing having a feed pipe leading through the outer and inner casing across the circulation conduit and into the bath, and a valve controlled water supply pipe leading to the tank provided with a float.

3. A steam cooker consisting of an outer casing having an uppermost outlet flue and a lower heat generating compartment, a heater in said compartment, an inner casing spaced inwardly from the sides, back and top of the outer casing providing a surrounding gas circulation conduit and terminating at the front in the plane of the outer casing, said inner casing having at its base a water bath, a front door framing and inner transverse supports above the bath, a vapor outlet conduit extending from the top of the inner casing through the gas circulation conduit and the top of the outer casing, an opening and closing door in the framing, means for collecting drip water from the door, a water supply tank fixedly mounted at one side of the outer casing having a feed pipe leading through the outer and inner casing across the circulation conduit and into the bath, and a valve controlled water supply pipe leading to the tank provided with a float.

4. The combination with an outer rectangular casing having an uppermost outlet flue and a lowermost combustion chamber, of a cooking compartment enclosed within an inner casing spaced from the sides, back and top of the outer casing providing a gas circulation conduit and terminating at the front in the plane of the outer casing, said inner casing having a lower water containing basin above the combustion chamber, a front wall provided with a door opening into the cooking compartment and an outer moisture collector, a door for said opening, a water supply tank fixedly mounted at one side of the outer casing having a supply pipe leading to the lower portion of the water basin through the outer and inner casing across the gas circulation conduit, and a supply pipe for the tank having a float controlled inlet valve.

5. In a steam cooker provided with an outer and an inner casing providing a lower combustion chamber and continuous gas circulation spaces between the sides, back and top walls of said casings, with a water basin in the lower portion of the inner casing above the combustion chamber and means for furnishing a regulated supply of water thereto, a front wall connected with both of said casings provided with a door opening leading into the inner casing above the water basin, a door therefor, and a drip trough located across the face of the front wall below the door opening.

6. In a steam cooker provided with an outer and an inner casing providing a lower combustion chamber and continuous gas circulation spaces between the sides, back and top walls of said casings, with a water basin in the lower portion of the inner casing above the combustion chamber and means for furnishing a regulated supply of water thereto, a front wall connected with both of said casings provided with a door opening leading into the inner casing above the water basin, a door therefor, and a drip trough located across the face of the front wall below the door opening, having an upper projecting sill and a release drain cock.

In testimony whereof I hereunto affix my signature.

JOHN EDWARD GLOEKLER.